US 6,621,546 B2

(12) United States Patent
Yang et al.

(10) Patent No.: US 6,621,546 B2
(45) Date of Patent: Sep. 16, 2003

(54) ELECTRODE ARRAY OF IN-PLANE SWITCHING MODE LIQUID CRYSTAL DISPLAY

(75) Inventors: Kie-Hsiung Yang, Taoyuan Hsien (TW); Sheng-Hsien Lin, Tainan Hsien (TW)

(73) Assignee: Hannstar Display Corp., Taipei (TW)

( * ) Notice: Subject to any disclaimer, the term of this patent is extended or adjusted under 35 U.S.C. 154(b) by 47 days.

(21) Appl. No.: 10/033,651

(22) Filed: Dec. 27, 2001

(65) Prior Publication Data

US 2002/0097365 A1 Jul. 25, 2002

(30) Foreign Application Priority Data

Jan. 19, 2001 (TW) ........................................ 90101274 A

(51) Int. Cl.$^7$ .......................... G02F 1/136; G02F 1/1343
(52) U.S. Cl. .......................... 349/141; 349/44; 349/142; 257/296
(58) Field of Search .......................... 349/141, 44, 142; 257/296

(56) References Cited

U.S. PATENT DOCUMENTS 5,838,037 A * 11/1998 Msutani et al. ............. 257/296
6,111,627 A * 8/2000 Kim et al. .................. 349/141
6,271,903 B1 * 8/2001 Shin et al. .................. 349/110

FOREIGN PATENT DOCUMENTS

JP          56-091277          7/1981

* cited by examiner

*Primary Examiner*—Julie Ngo
(74) *Attorney, Agent, or Firm*—Ladas & Parry

(57) ABSTRACT

An electrode array of IPS-LCD has a comb-shaped common electrode made by patterning a bottom-metal layer, respectively disposed and a comb-shaped pixel electrode made by patterning an inter-metal layer, and a connecting layer made by patterning a top-metal layer. The comb-shaped common electrode has a bar and a plurality of comb-teeth extending in a first Y-direction. The comb-shaped pixel electrode has a bar and a plurality of comb-teeth that extend in a second Y-direction and are inter-digitated with the comb-teeth of the common electrode. The connecting layer is electrically connected to one end of the comb-teeth of the pixel electrode and covers part of the bar of the common electrode. In addition, two strip-shaped metal-shielding layers made by patterning the top-metal layer are disposed over the comb-teeth of the common electrode to eliminate crosstalk.

13 Claims, 19 Drawing Sheets

ELECTRODE ARRAY OF IN-PLANE SWITCHING MODE LIQUID CRYSTAL DISPLAY

BACKGROUND OF THE INVENTION

1. Field of the Invention

The present invention relates in general to an in-plane switching mode liquid crystal display (IPS-LCD). In particular, the present invention relates to an electrode array of an IPS-LCD and methods of fabrication thereof.

2. Description of the Related Art

Liquid crystal displays (LCDs) may be classified by the orientation of the liquid crystal molecules between the spaced apart substrates. In a conventional twisted nematic (TN)-LCD, the liquid crystal molecules are twisted between the two substrates. In contrast, in an in-plane switching mode (IPS)-LCD, common electrodes and pixel electrodes are formed on a lower glass substrate (TFT substrate) and an in-plane electrode field therebetween is generated to rearrange the liquid crystal molecules along the electrode field. Accordingly, the IPS-LCD has been used or suggested for improving drawbacks of the conventional TN-LCD, such as a very narrow viewing angle and a low contrast ratio.

In order to achieve a better result of the in-plane electrode field, various designs for an electrode array of the IPS-LCD are built to solve the problems such as an insufficient aperture ratio, crosstalk produced between data lines and common electrodes, and increasing masks used in patterning. Specially, JP 56-91277 discloses with respect to a comb-shaped electrode array. Please refer to FIG. 1A, which shows a circuit structure of a conventional IPS-LCD. The IPS-LCD has gate lines 1, data lines 5 crossing over the gate lines 1, a thin film transistor (TFT) 2 formed at the intersection of the gate line 1 and the data line 5, a comb-shaped pixel electrode 4, and a comb-shaped common electrode 3. In the TFT 2, a source electrode is electrically connected to the data line 5, and a drain electrode is electrically connected to one end of the comb-shaped pixel electrode 4. The common electrode 3 has a bar parallel to the gate line 1 and a plurality of comb-teeth extending away from the bar and parallel to the data line 5 toward a first direction. The pixel electrode 4 has a bar parallel to the gate line 1 and a plurality of comb-teeth extending away from the bar and parallel to the data line 5 toward a second direction. The comb-teeth of the common electrode 3 are separated from the comb-teeth of the pixel electrode 4 by a predetermined distance. When the common electrode 3 and the pixel electrode 4 are respectively grounded, an in-plain electrode field is generated therebetween.

In the comb-shaped electrode array, for increasing the storage of signals, a storage capacitor can be fabricated on the bar of the common electrode 3. However, no reference discloses with respect to a technique for employing a conductor to cover the storage capacitor and connect to the pixel electrode. As well, with reference to a cross-sectional diagram as shown in FIG. 1B, crosstalk easily occurs between the comb-teeth of the common electrode 3 and the data line 5.

SUMMARY OF THE INVENTION

An object of the present invention is to provide a comb-shaped electrode array of an IPS-LCD to increase the storage of signals.

Another object of the present invention is to provide a comb-shaped electrode array of an IPS-LCD to eliminates the crosstalk produced between the common electrode and the data line.

The electrode array of the IPS-LCD in the present invention includes:

a plurality of gate lines made by patterning a bottom-metal layer and disposed in an X-direction;

a plurality of data lines made by patterning a inter-metal layer and disposed in a Y-direction, wherein two adjacent data lines and two adjacent gate lines constitute a pixel area;

a plurality of comb-shaped common electrodes made by patterning the bottom-metal layer and respectively disposed in each pixel area, wherein each comb-shaped common electrode comprises a bar parallel to the gate line and a plurality of comb-teeth extending in a first Y-direction a plurality of comb-shaped pixel electrode made by patterning the inter-metal layer and respectively disposed in each pixel area, wherein each comb-shaped pixel electrode comprises a bar parallel to the gate line and a plurality of comb-teeth which extend in a second Y-direction and are inter-digitated with the comb-teeth of the common electrode;

a connecting layer made by patterning a top-metal layer to electrically connect with one end of the comb-teeth of the pixel electrode and cover part of the bar of the common electrode a first strip-shaped metal-shielding layer made by patterning the top-metal layer and disposed over the rightmost comb-tooth of the common electrode, wherein the first metal-shielding layer extends to electrically connect with the bar of the common electrode; and a second strip-shaped metal-shielding layer made by patterning the top-metal layer and disposed over the leftmost comb-tooth of the common electrode, wherein the first metal-shielding layer extends to electrically connect with the bar of the common electrode.

It is an advantage of the present invention that the connecting layer can increase the signal storage capacity. Also, the strip-shaped metal-shielding layers disposed over the comb-teeth of the common electrode can eliminate crosstalk.

This and other objective of the present invention will no doubt become obvious to those of ordinary skill in the art after having read the following detailed description of the preferred embodiment which is illustrated in the various figures and drawings.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1A:
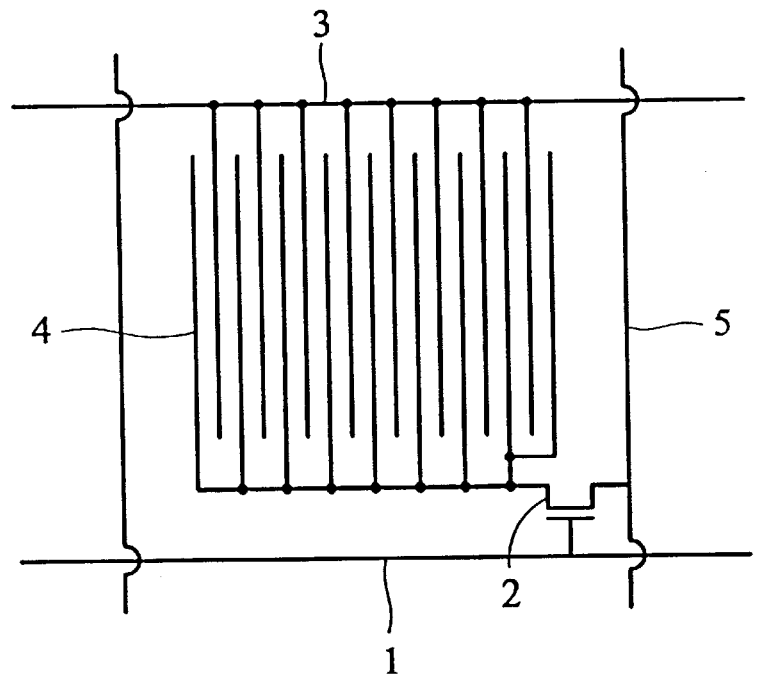
FIG. 1A shows a circuit structure of a conventional IPS-LCD.
Figure 1B:
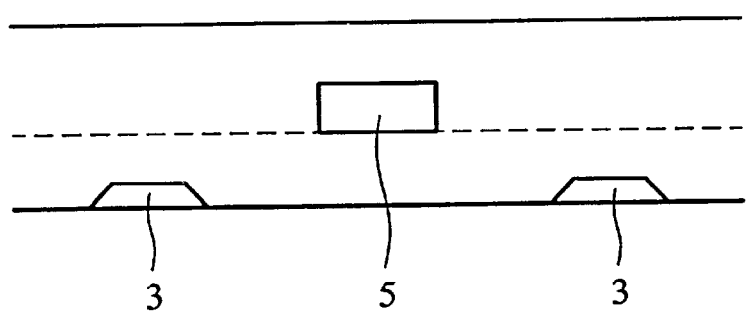
FIG. 1B shows a cross-sectional diagram according to a conventional IPS-LCD.
Figure 1C:
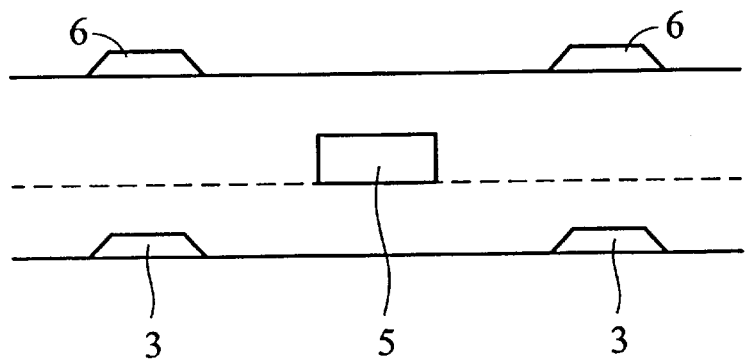
FIG. 1C shows a cross-sectional diagram according to IPS-LCD of the present invention.

The present invention provides a comb-shaped electrode array of an IPS-LCD, which employs a conductor to cover a storage capacitor and is connected with one end of the comb-teeth of a pixel electrode to increase signal storage capacity. A metal-shielding layer is also provided for eliminating the crosstalk produced between a common electrode and a data line. Compared with the prior art as shown in FIG. 1B, in the present invention as shown in FIG. 1C, a metal-shielding layer 6 is formed over the common electrode 3 to provide a shielding effect between the comb-teeth of the common electrode 3 and the data line 5. The metal-shielding layer 6, the data line 5 and the common electrode 3 which constitute a three-dimensional array can eliminate crosstalk and thereby promote the image quality of the IPS-LCD.

[First Embodiment]

Figure 2:
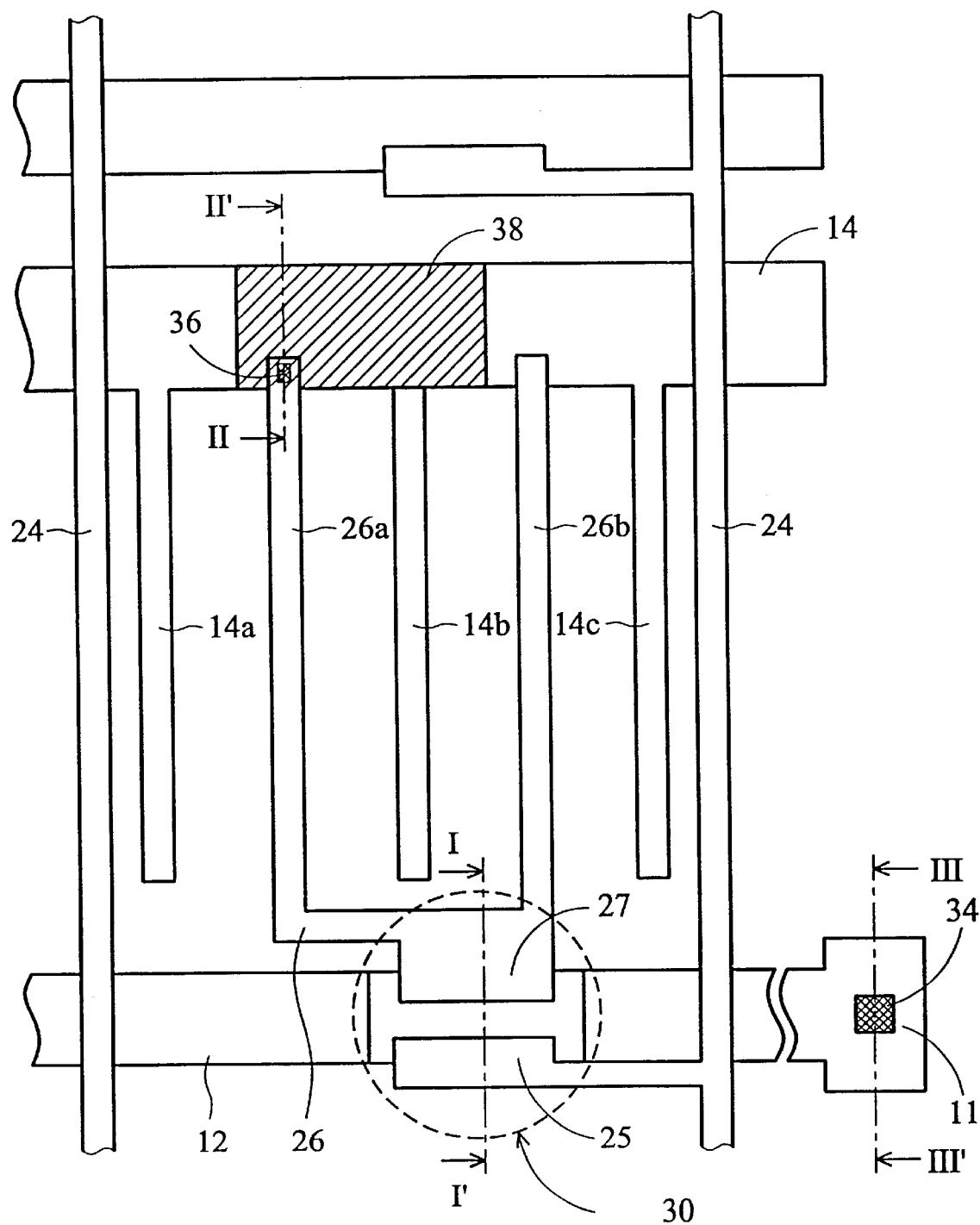
FIG. 2 shows a top view of the electrode array of the IPS-LCD according to the first embodiment of the present invention.

Please refer to FIG. 2, which shows a top view of the electrode array of the IPS-LCD according to the first embodiment of the present invention. In the IPS-LCD, each pixel area is defined by two gate lines 12 disposed in an X-direction and two data lines 24 disposed in a Y-direction, wherein a comb-shaped common electrode 14 and a comb-shaped pixel electrode 26 are disposed. Preferably, the comb-shaped common electrode 14 has a bar in the X-direction and three comb-teeth 14a, 14b, 14c extending away from the bar along the Y-direction. The comb-shaped pixel electrode 26 has a bar in the X-direction and two comb-teeth 26a, 26b extending away from the bar along the Y-direction, wherein the two comb-teeth 26a, 26b are inter-digitated with the three comb-teeth 14a, 14b, 14c. Therefore, each pixel area is divided into four sub-pixel areas. Also, a TFT 30 has a gate electrode formed on a predetermined area of the gate line 12, a drain electrode 27 electrically connected to the bar of the pixel electrode 26, and a source electrode 25 electrically connected to the data line 24, wherein a channel is formed between the drain electrode 27 and the source electrode 25. Furthermore, the IPS-LCD comprises a first via 34 for exposing the gate pad 11, a second via for exposing the end of the comb-tooth 26a of the pixel electrode 26, and a connecting layer 38 for filling the first via 34, the second via 36 and part of the bar of the common electrode 14. As a result, the connecting layer 38 can electrically connect with the comb-tooth 26a through the second via 36, and the coverage of the bar of the common electrode 14 by the connecting layer 38 can serve as a storage capacitor.

Hereinafter, two methods of fabricating the TFT 30 are provided, such as an etching stopper (ES) type and a back channel (BC) type, to explain the method of forming the electrode array in the first embodiment.

Figure 3A:
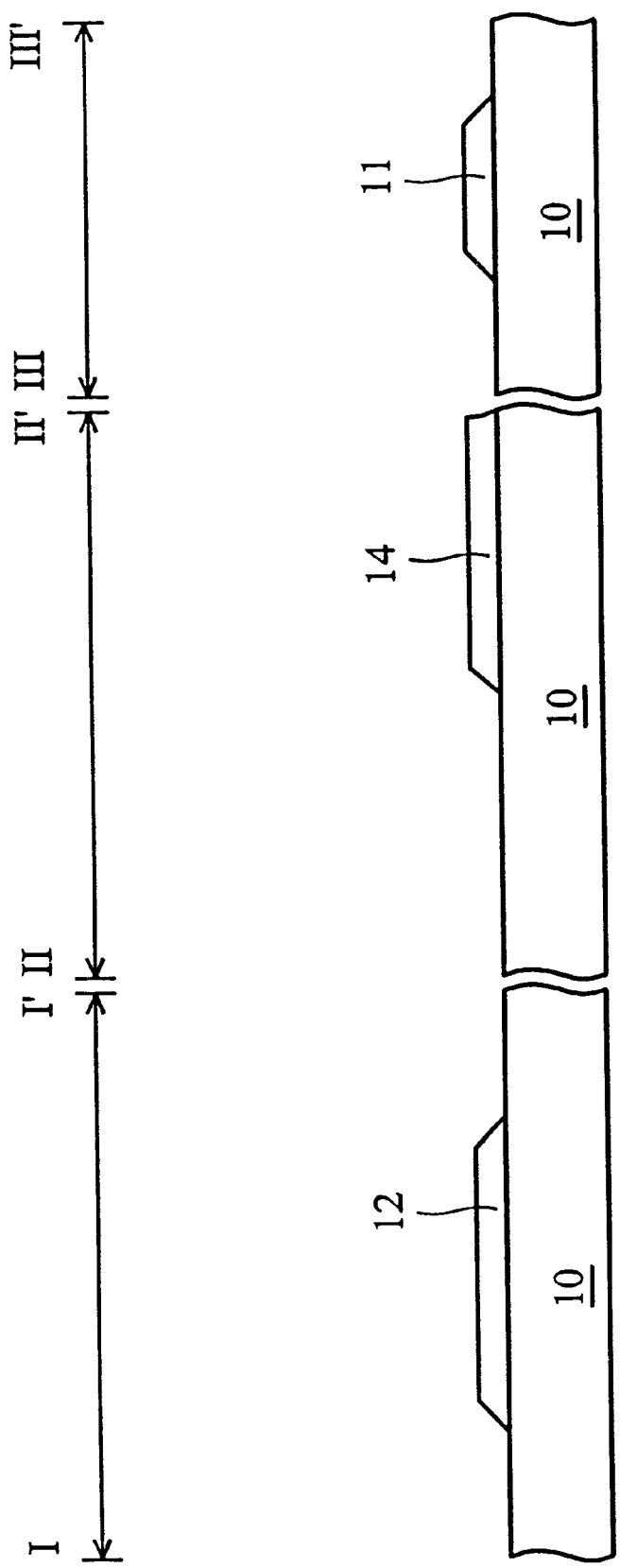
FIGS. 3A to 3E are cross-sections along lines of I–I', II–II', III–III' shown in FIG. 2 to show a method for forming the electrode array by using an ES type.
Figure 3B:
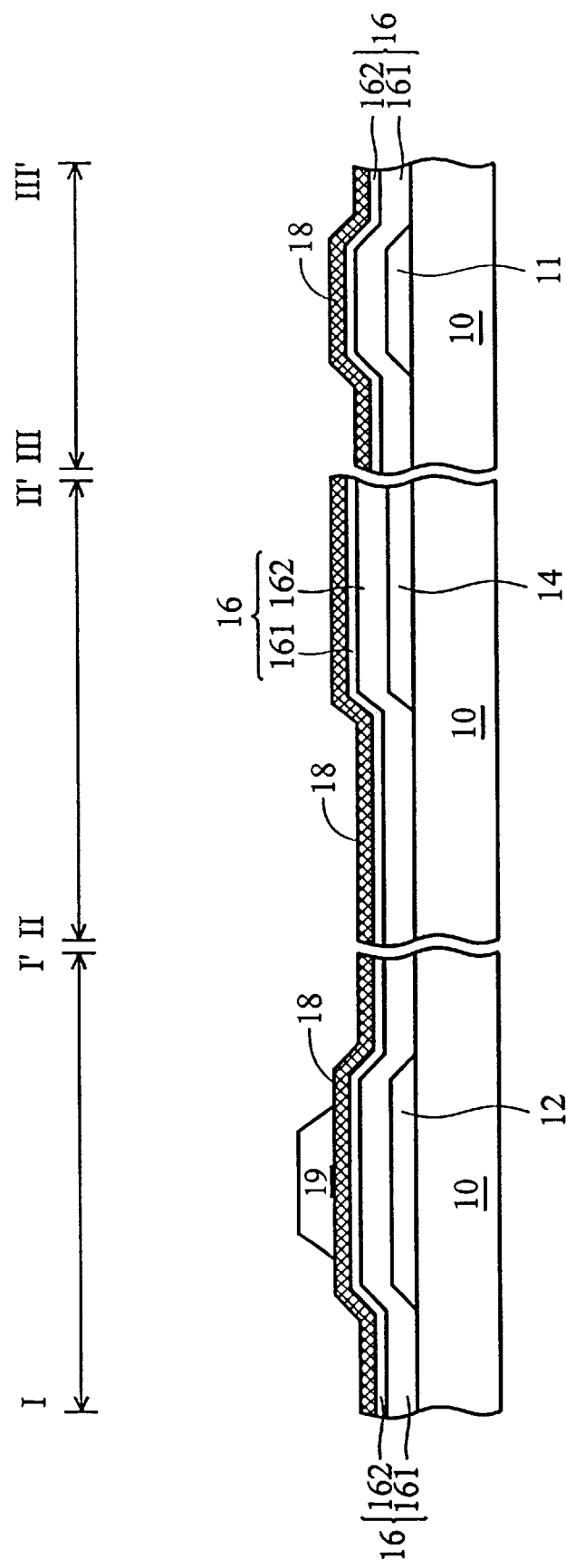

Please refer to FIGS. 3A to 3E, cross-sections along lines of I–I', II–II', III–III' shown in FIG. 2 to show a method for forming the electrode array using an ES type. As shown in FIG. 3A, a first metal layer is formed on a glass substrate 10 and then patterned by a first mask to form the gate line 12 and the comb-shaped common electrode 14, wherein a predetermined area of the gate line 12 serving as the gate electrode, the end of the gate line 12 serving as the gate pad 11, and the bar of the common electrode 14 are depicted in the cross-sectional diagram. As shown in FIG. 3B, an insulating layer 16, a first semiconductor layer 18 and a silicon nitride layer 19 are sequentially formed on the substrate 10, wherein the insulating layer 16 is a silicon oxide layer 161 and a silicon nitride layer 162, and the first semiconductor layer 18 is amorphous silicon (a-Si). Next, a second mask is employed to pattern the silicon nitride layer 19 as an etching stopper 19 that only remains over the gate electrode.

Figure 3C:
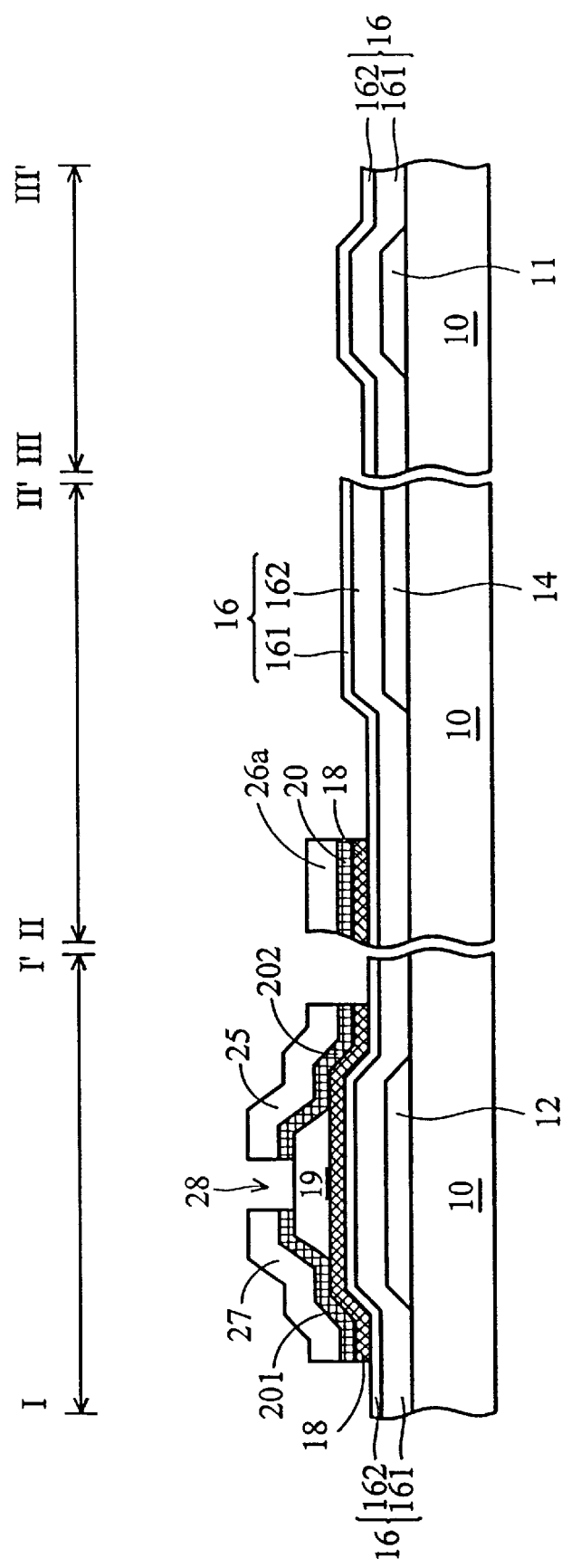

As shown in FIG. 3C, a second semiconductor layer 20 made of doped amorphous silicon, such as n$^+$a-Si and a second metal layer are sequentially formed on the substrate 10. Next, a third mask is employed to pattern the first semiconductor layer 18, the second semiconductor layer 20 and the second metal layer as an island structure over the gate electrode, wherein an opening 28 is formed to expose the etching stopper 19 and thereby the separated parts of the second metal layer respectively serve as the drain electrode 27 and the source electrode 25, the separated parts of the second semiconductor layer 20 respective serve as a drain region 201 and a source region 202. At the same time, the second metal layer is patterned to serve as the data line 24 and comb-shaped pixel electrode 26.

Figure 3D:
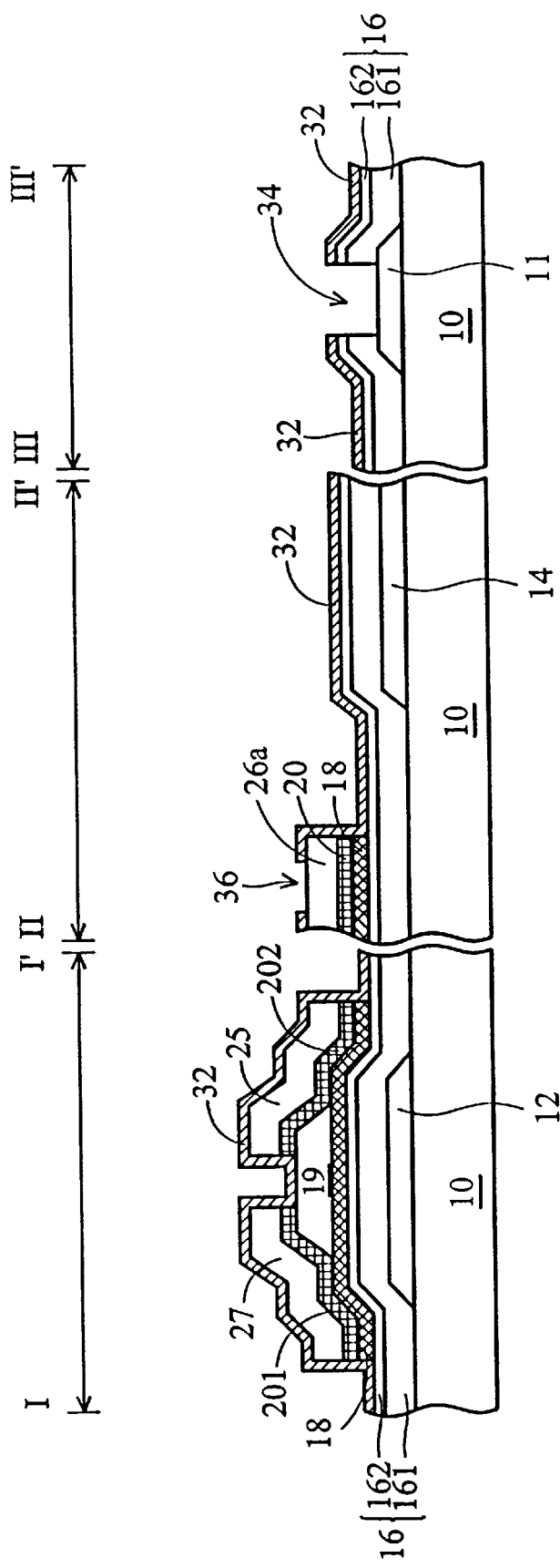
Figure 3E:
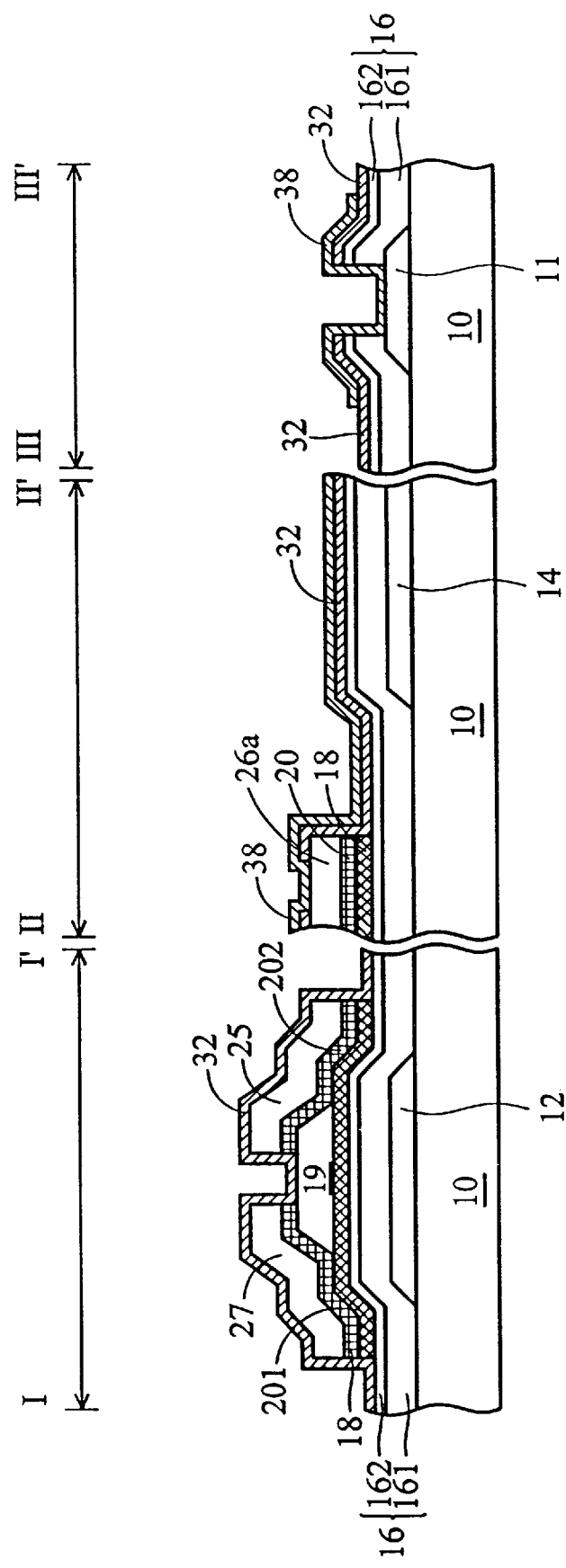

As shown in FIG. 3D, a protective layer 32 made of silicon nitride is covered on the substrate 10, and then a fourth mask is employed to define the first via 34 that exposing the gate pad 11 and the second via 36 that exposing the end of the comb-tooth 26a of the pixel electrode 26. Finally, as shown in FIG. 3E, a conductive layer is formed on the substrate 10 and then patterned by a fifth mask, wherein the conductive layer remaining in the second via 36 and on part of the bar of the common electrode 14 serves as the connecting layer 38. The connecting layer 38 can be made by the same opaque materials with the first metal layer and the second metal layer, such as MoW'Mo/Al'AlNd. Preferably, the connecting layer 38 can be made by transparent materials, such as indium tin oxide (ITO) to increase aperture ration of each pixel area.

Figure 4A:
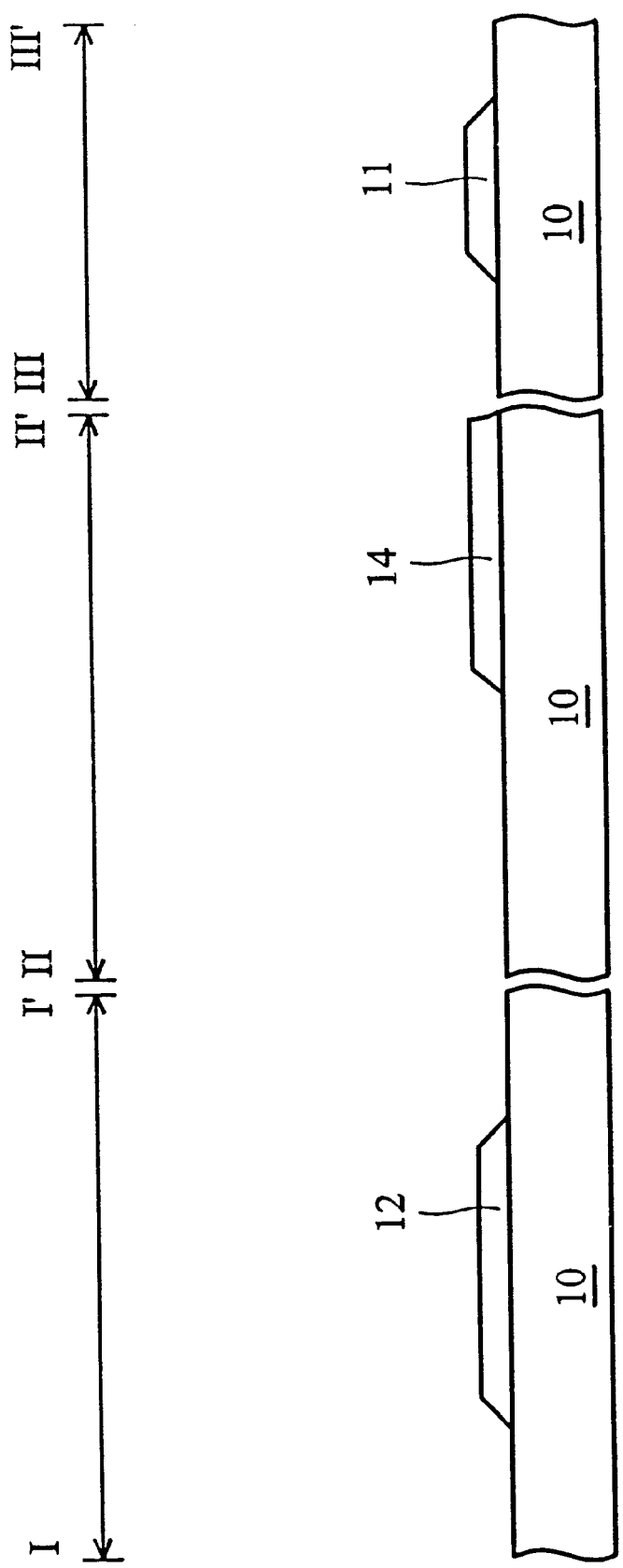
FIGS. 4A to 4E are cross-sections along lines of I–I', II–II', III–III' shown in FIG. 2 to show a method for forming the electrode array by using a BC type.
Figure 4B:
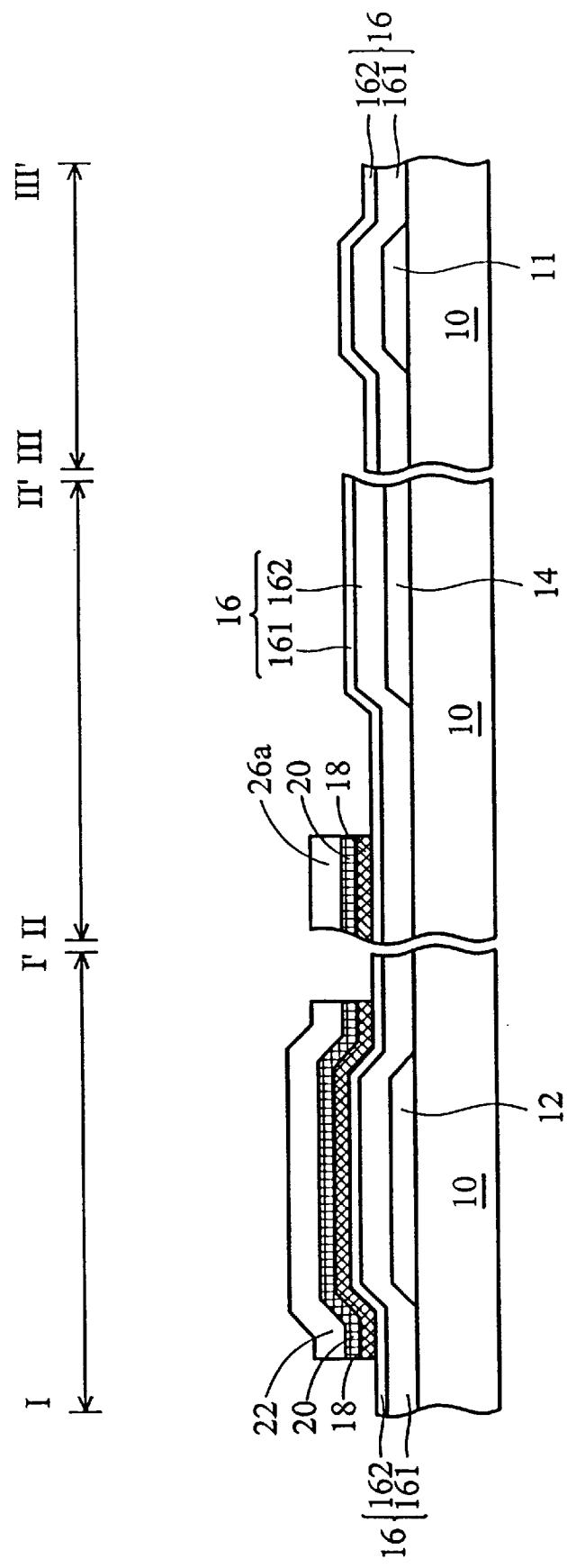

Please refer to FIGS. 4A to 4E, which are cross-sections along lines of I–I', II–II', III–III' shown in FIG. 2 to show a method for forming the electrode array using a BC type. As shown in FIG. 4A, a first metal layer is formed on a glass substrate 10 and then patterned by a first mask to form the gate line 12 and the comb-shaped common electrode 14, wherein a predetermined area of the gate line 12 serves as the gate electrode, the end of the gate line 12 serves as the gate pad 11, and the bar of the common electrode 14 is depicted in the cross-sectional diagram. As shown in FIG. 4B, an insulating layer 16, a first semiconductor layer 18, a second semiconductor layer 20 and a second metal layer 22 are sequentially formed on the substrate 10, wherein the insulating layer 16 is a silicon oxide layer 161 and a silicon nitride layer 162, the first semiconductor layer 18 is amorphous silicon (a-Si), and the second semiconductor layer 20 is doped amorphous silicon (n$^+$a-Si). Next, a second mask is employed to pattern the first semiconductor layer 18, the second semiconductor layer 20 and the second metal layer 22 as an island structure over the gate electrode. At the same time, the second metal layer 22 is patterned to serve as the data line 24 and comb-shaped pixel electrode 26.

Figure 4C:
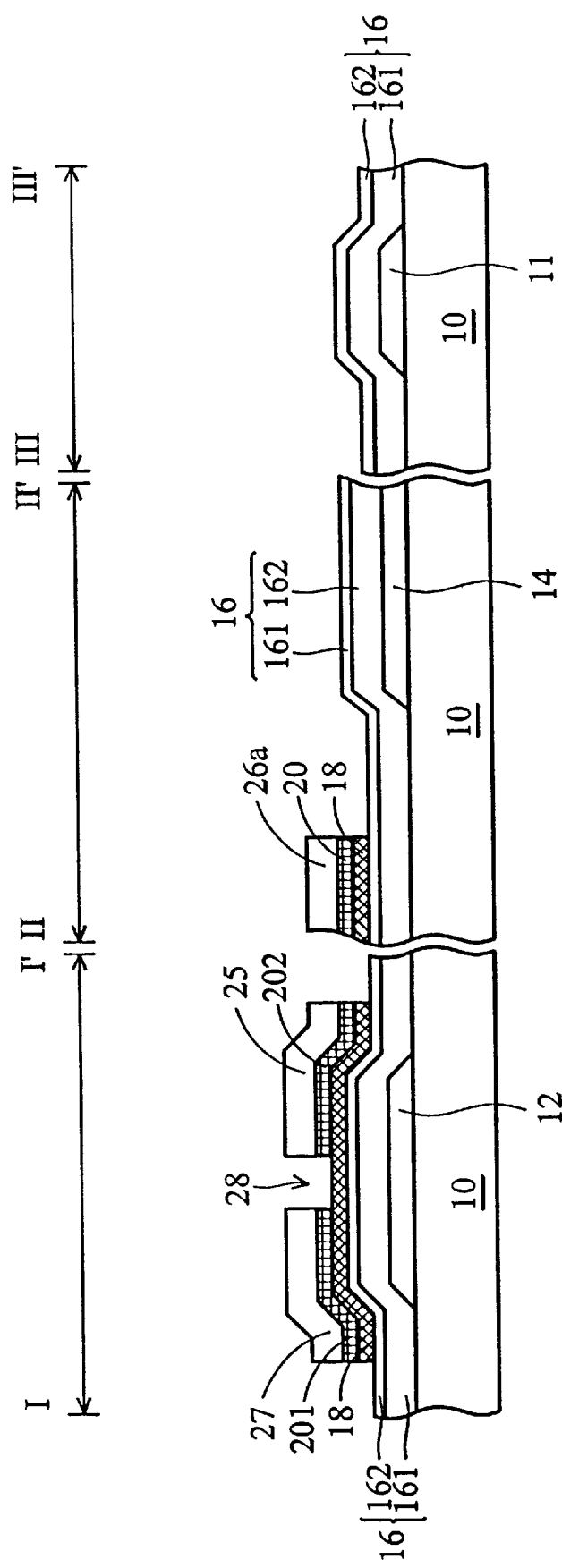

As shown in FIG. 4C, by using a third mask, an opening 28 is formed on the island structure to expose the first semiconductor layer 18, and thereby the separated parts of the second metal layer 22 respectively serve as the drain electrode 27 and the source electrode 25, the separated parts of the second semiconductor layer 20 respectively serving as a drain region 201 and a source region 202.

Figure 4D:
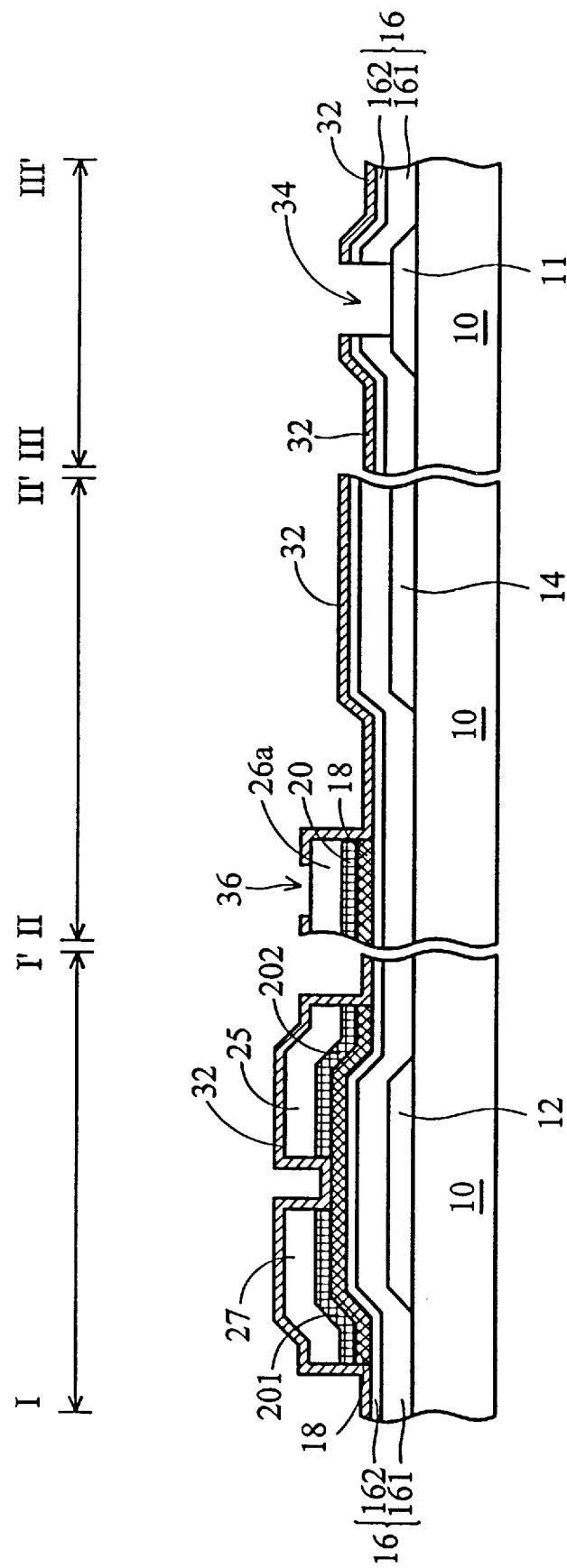
Figure 4E:
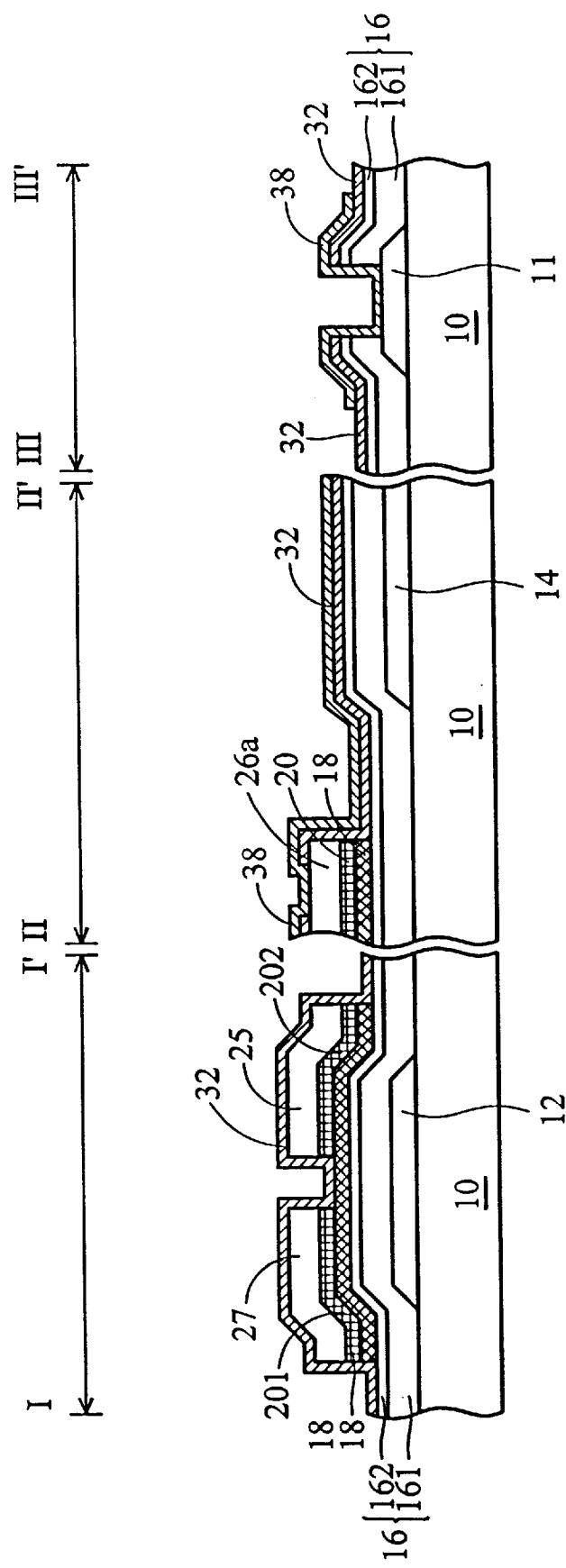

As shown in FIG. 4D, a protective layer 32 made of silicon nitride is formed on the substrate 10, and then a fourth mask is employed to define the first via 34, exposing the gate pad 11, and the second via 36, exposing the end of the comb-tooth 26a of the pixel electrode 26. Finally, as shown in FIG. 4E, a conductive layer is formed on the substrate 10 and then patterned by a fifth mask, wherein the conductive layer remaining in the second via 36 and on part of the bar of the common electrode 14 serves as the connecting layer 38.

Figure 5:
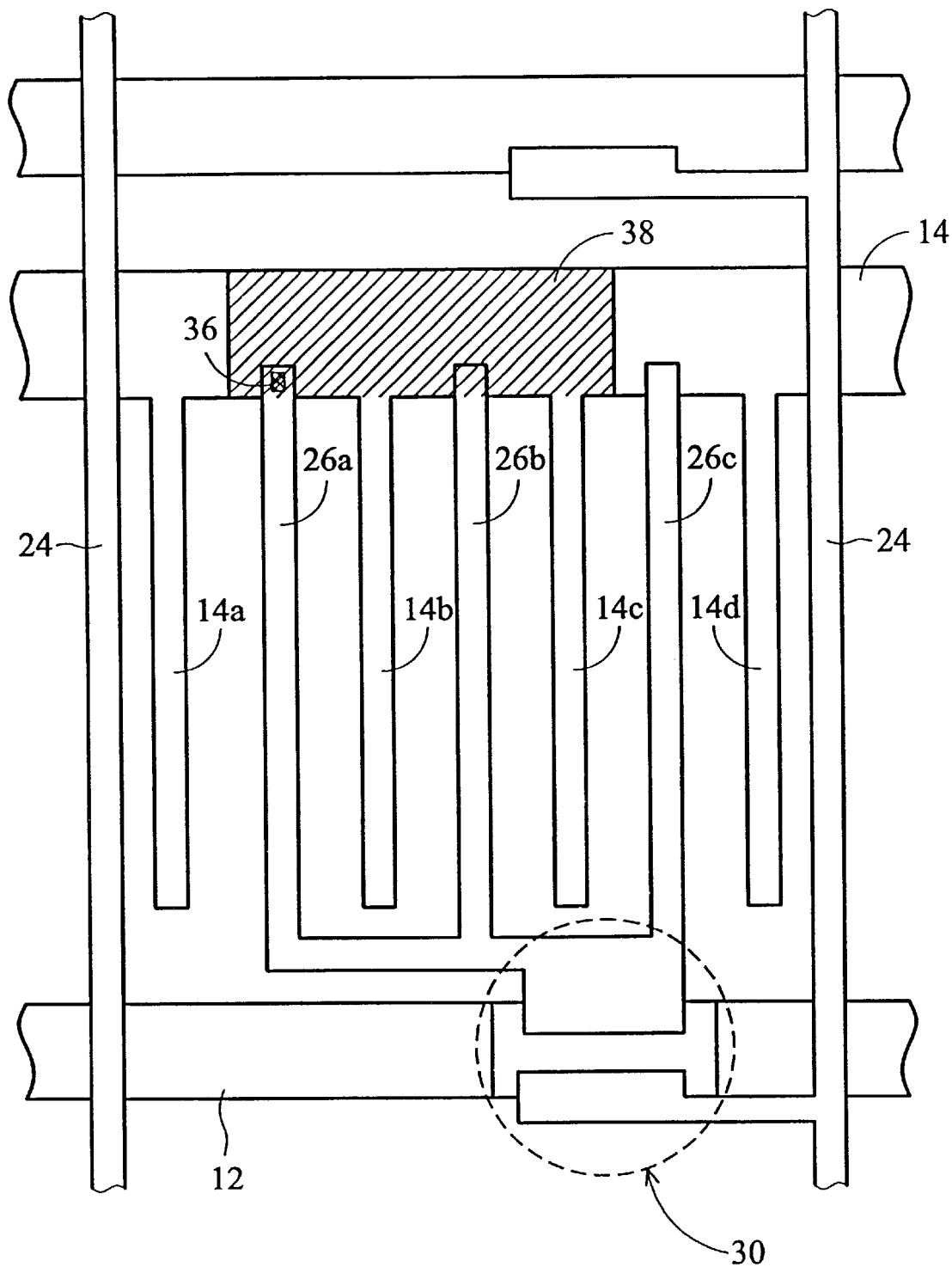
FIG. 5 shows a top view of the electrode array of another IPS-LCD according to the first embodiment of the present invention.

In addition, the above-mentioned electrode array and methods of fabrication thereof are applied to another IPS-LCD with six sub-pixel area per pixel area. Please refer to FIG. 5, which shows a top view of the electrode array of another IPS-LCD according to the first embodiment of the present invention. In each pixel area, the comb-shaped common electrode 14 has four comb-teeth 14a, 14b, 14c, 14d, and the comb-shaped pixel electrode 26 has three comb-teeth 26a, 26b, 26c. Therefore, the inter-digitated comb-teeth divide each pixel area into six sub-pixel areas. According to the above-mentioned methods, the second via 36 is formed to expose the end of the comb-tooth 26a, and the connecting layer 38 is covered on part of the bar of the common electrode 14 and fills the second via 36.

[Second Embodiment]

Figure 6A:
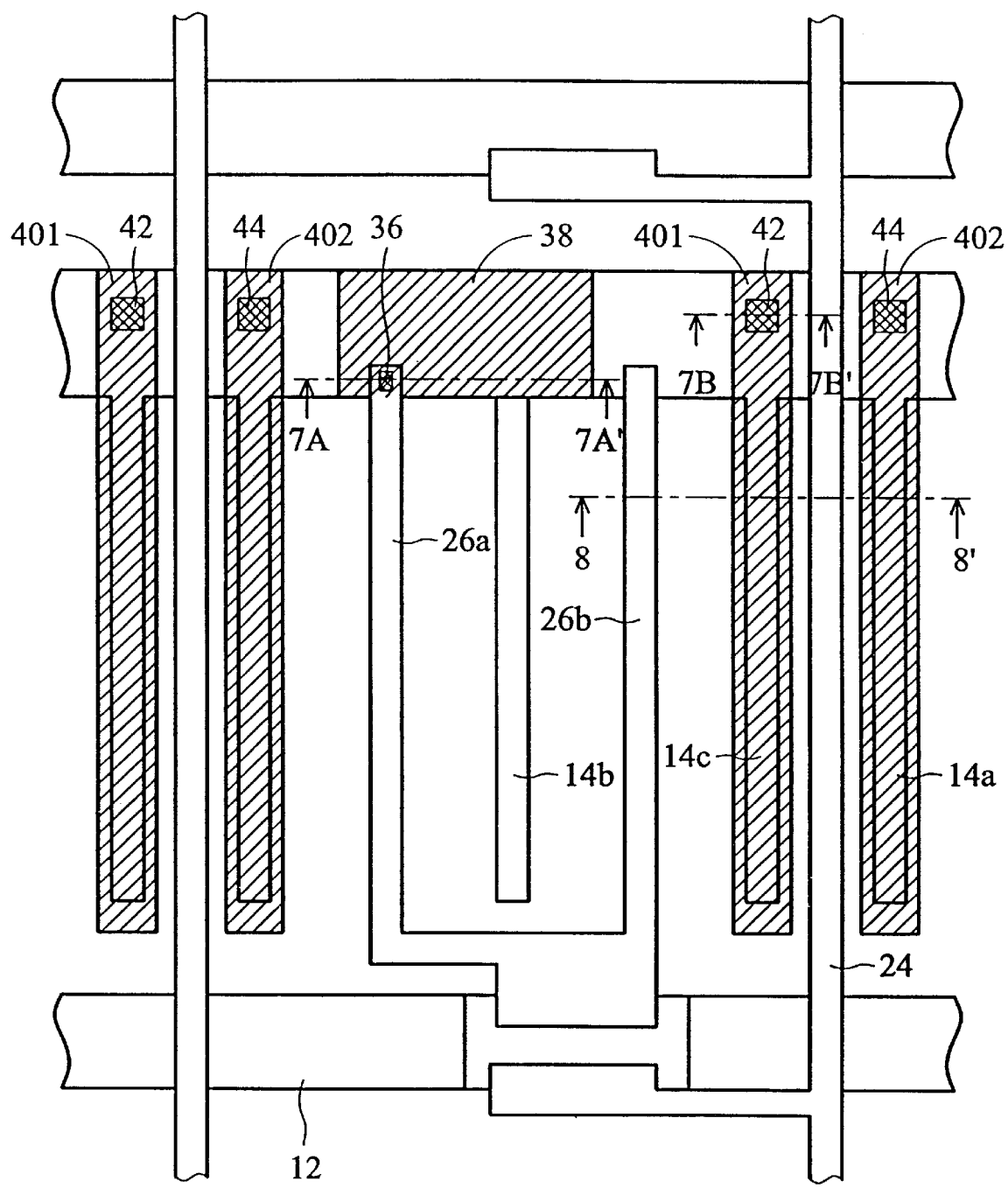
FIGS. 6A and 6B show top views of the electrode array of the IPS-LCD according to the second embodiment of the present invention.
Figure 6B:
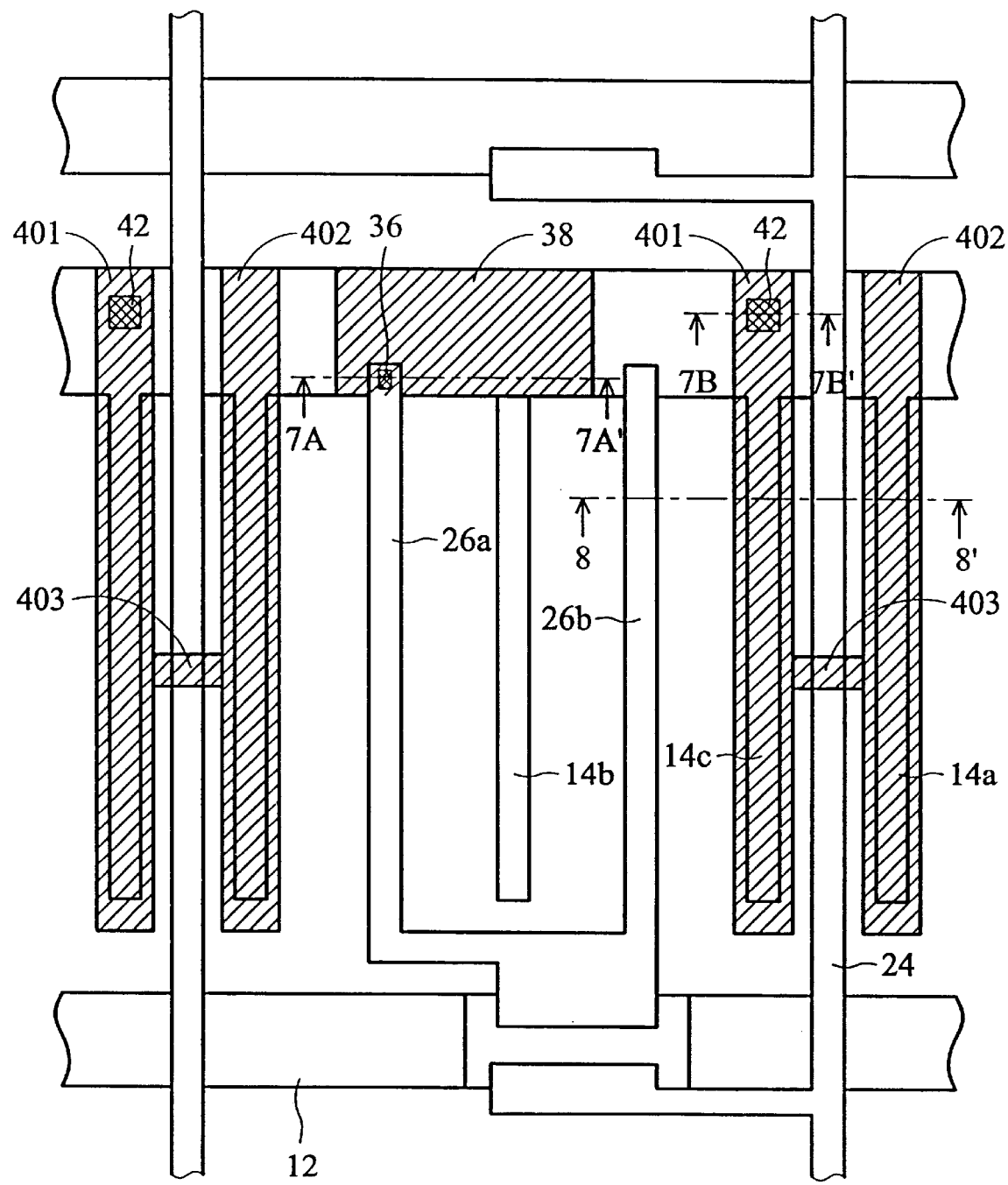
Figure 7:
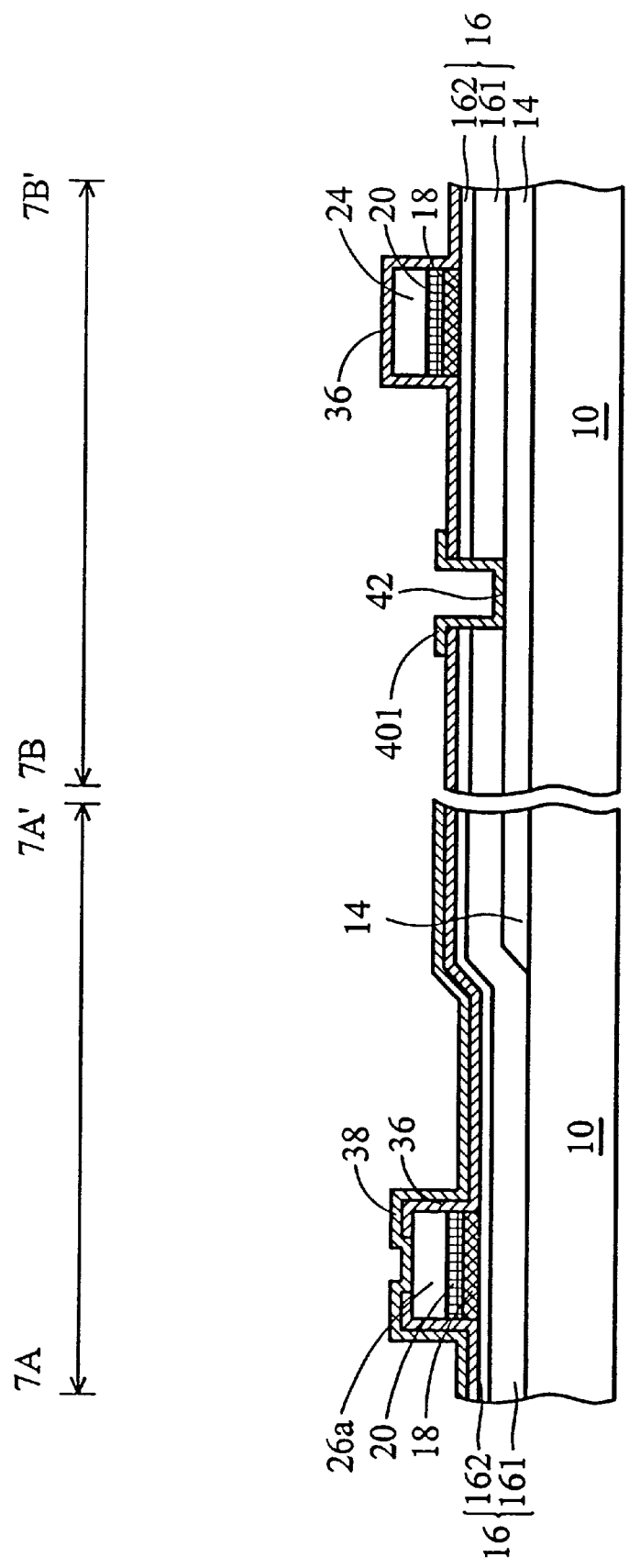
FIG. 7 shows a cross-sectional diagram along lines I–I', II–II', III—III in FIG. 6.
Figure 8:
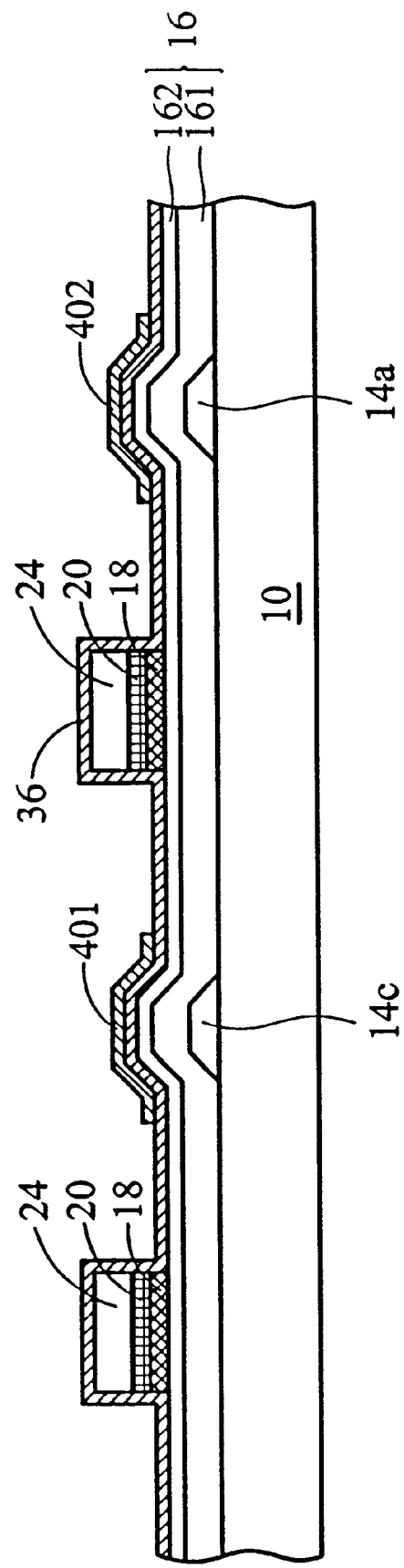
FIG. 8 shows a cross-sectional diagram along line 8–8' in FIG. 6.

The second embodiment provides a metal-shielding layer to further improve aperture ratio and eliminate crosstalk. Please refer to FIGS. 6 to 8, wherein FIGS. 6A and 6B show top views of the electrode array of the IPS-LCD according to the second embodiment of the present invention, FIG. 7 shows a cross--sectional diagram along lines I–I', II–II', III—III in FIG. 6, and FIG. 8 shows a cross-sectional diagram along line 8–8' in FIG. 6. As shown in FIG. 6A, on the bar of the common electrode 14, a third via 42 and a fourth via 44 passing through the protective layer 36 are respectively formed on two predetermined regions to which the comb-teeth 14c, 14a extend at the same time that the first via 34 and the second via 36 are patterned by the fourth mask. Next, when using the fifth mask to pattern the conductive layer, not only the connecting layer 38, but also a first strip-shaped metal-shielding layer 401 and a second trip-shaped metal-shielding layer 401 are formed. The first metal-shielding layer 401 covers the comb-tooth 14c, extends to cover the bar of the common electrode 14, and fills the third via 42. The first metal-shielding layer 401 neither covers the data line 24 nor connects to the connecting layer 38. The second metal-shielding layer 402 covers the comb-tooth 14a, extends to cover the bar of the common electrode 14, and fills the fourth via 44. The second metal-shielding layer 402 does not cover the data line 24 nor connect to the connecting layer 38. With respect to the first metal-shielding layer 401 in a pixel area and the second metal-shielding layer 402 in an adjacent pixel area, the first metal-shielding layer 401 and the second metal-shielding layer 402 are electrically connected with each other through the third via 42 and the fourth via 44. Besides, if the fourth via 44 is not fabricated, as shown in FIG. 6B, a third metal-shielding layer 403 can be formed when the conductive layer is patterned by the fifth mask, wherein the third metal-shielding layer 403 crosses the data line 24 to connect the first metal-shielding layer 401 and the second metal-shielding layer 402.

As shown in FIGS. 7 and 8, the comb-teeth 14a, 14c of the common electrode 14, the data line 24 and the metal-shield layers 401, 402 are placed on different layers, and thereby the three-dimensional array provides the preferable shielding effect to eliminate crosstalk produced between the common electrode 14 and the data line 24. Also, since the fifth mask forms the metal-shielding layers 401, 402, 403, there is no need to use extra masks. Furthermore, when the metal-shielding layers 401, 402, 403 are made by ITO, the aperture ratio of the IPS-LCD is highly improved.

Figure 9A:
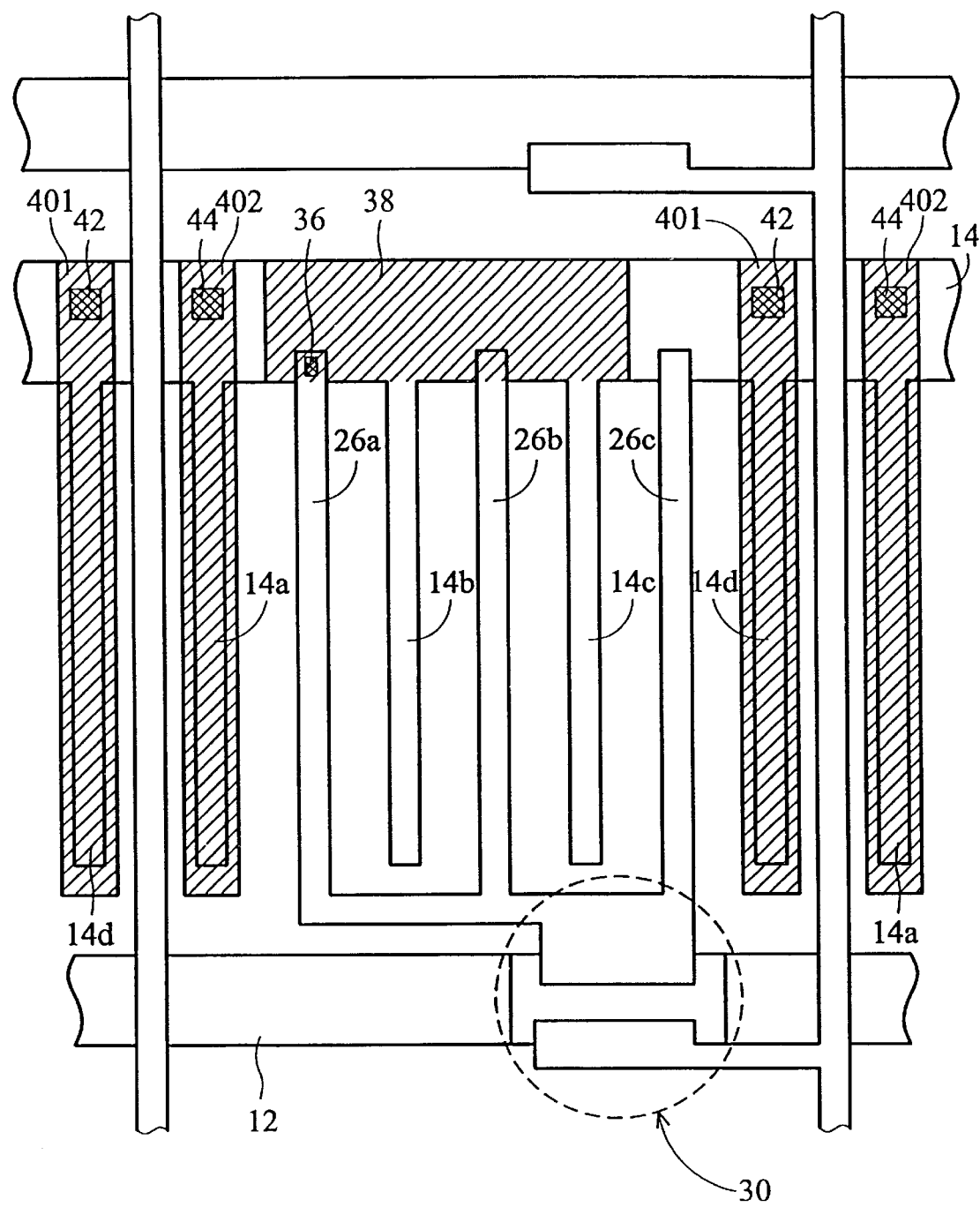
FIGS. 9A and 9B show top views of the electrode array of another IPS-LCD according to the second embodiment of the present invention.
Figure 9B:
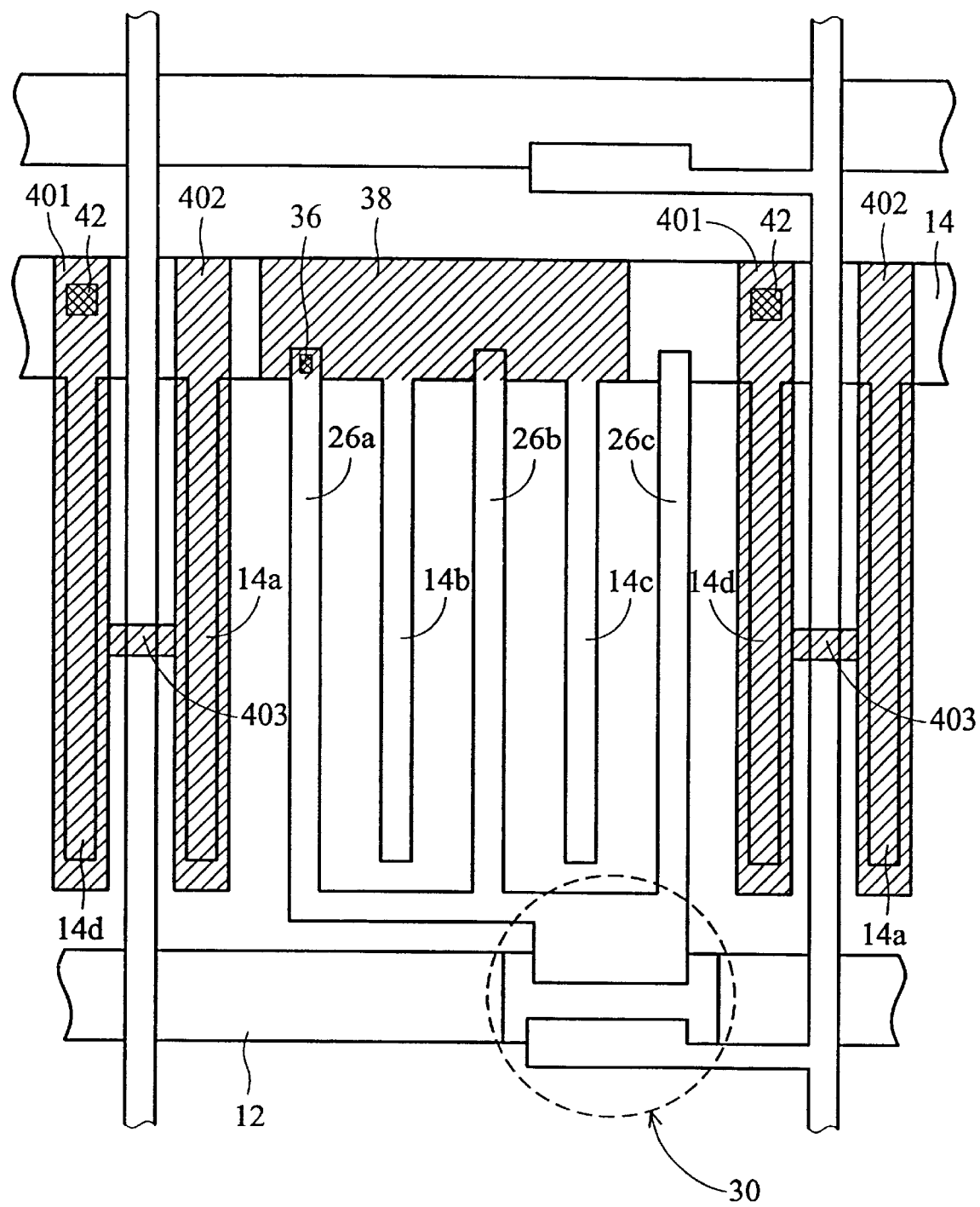

In addition, the above-mentioned electrode array and methods of fabricating thereof in the second embodiment are also applied to the IPS-LCD with six sub-pixel areas per pixel. Please refer to FIGS. 9A and 9B, which show top views of the electrode array of another IPS-LCD according to the second embodiment of the present invention. In each pixel area, the inter-digitated comb-teeth divide each pixel area into six sub-pixel areas. According to the above-mentioned methods, the third via 42 and a fourth via 44 are respectively formed on the bar on two predetermined regions to which the comb-teeth 14d, 14a extend. Also, as shown in FIG. 9A, the first metal-shielding layer 401 covers the comb-tooth 14d, extends to cover the bar of the common electrode 14, and fills the third via 42. The second metal-shielding layer 402 covers the comb-tooth 14a, extends to cover the bar of the common electrode 14, and fills the fourth via 44. Alternatively, as shown in FIG. 9B, the third metal-shielding layer 403 that substitutes the fourth via 44 crosses the data line 24.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An electrode array of an in-plane switching mode liquid crystal display (IPS-LCD), comprising:
    a plurality of gate lines made by patterning a bottom-metal layer and disposed in an X-direction;
    a plurality of data lines made by patterning an inter-metal layer and disposed in an Y-direction, wherein two adjacent data lines and two adjacent gate lines constitute a pixel area;
    a plurality of comb-shaped common electrodes made by patterning the bottom-metal layer and respectively disposed in each pixel area, wherein each comb-shaped common electrode comprises a bar parallel to the gate lines and a plurality of comb-teeth extending in a first Y-direction
    a plurality of comb-shaped pixel electrodes made by patterning the inter-metal layer and respectively disposed in each pixel area, wherein each comb-shaped pixel electrode comprises a bar parallel to the gate lines and a plurality of comb-teeth, which extend in a second Y-direction, and are inter-digitated with the comb-teeth of the common electrode; and
    a connecting layer made by patterning a top-metal layer to electrically connect with one end of the comb-teeth of the pixel electrode and cover part of the bar of the common electrode;
    a first strip-shaped metal-shielding layer made by patterning the top-metal layer and disposed over the rightmost comb-tooth of the common electrode, wherein the first metal-shielding layer extends to electrically connect with the bar of the common electrode; and a second strip-shaped metal-shielding layer made by patterning the top-metal layer and disposed over the leftmost comb-tooth of the common electrode, wherein the first metal-shielding layer extends to electrically connect with the bar of the common electrode.

2. The electrode array as claimed in claim 1, wherein the electrode array is formed on a glass substrate.

3. The electrode array as claimed in claim 1, further comprising a protective layer disposed between the inter-metal layer and the top-metal layer.

4. The electrode array as claimed in claim 3, further comprising a first via which passes through the protective layer and exposes the end of the comb-teeth of the pixel electrode.

5. The electrode array as claimed in claim 4, wherein the connecting layer covers the sidewall and bottom of the first via.

6. The electrode array as claimed in claim 1, wherein the part of the bar of the common electrode covered by the connecting layer serves as a storage capacitor.

7. The electrode array as claimed in claim 1, further comprising a protective layer and an insulating layer disposed between the inter-metal layer and the top-metal layer.

8. The electrode array as claimed in claim 7, further comprising a second via which passes through the protective layer and the insulating layer and exposes a first predetermined area of the bar of the common electrode.

9. The electrode array as claimed in claim 8, wherein the first metal-shielding layer covers the sidewall and bottom of the second via.

10. The electrode array as claimed in claim 9, further comprising a third metal-shielding layer made by patterning the top-metal layer to electrically connect the first metal-shielding layer and the second metal-shielding layer.

11. The electrode array as claimed in claim 10, wherein the third metal-shielding layer is disposed across the data lines to electrically connect the first metal-shielding layer and the second metal-shielding layer respectively in two adjacent pixel areas.

12. The electrode array as claimed in claim 9, further comprising a third via which passes through the protective layer and the insulating layer and exposes a second predetermined area of the bar of the common electrode.

13. The electrode array as claimed in claim 12, wherein the second metal-shielding layer covers the sidewall and bottom of the third via.

* * * * *